US010058806B2

(12) United States Patent
Tange et al.

(10) Patent No.: US 10,058,806 B2
(45) Date of Patent: Aug. 28, 2018

(54) BALLAST WATER TREATMENT DEVICE

(71) Applicant: MIURA CO., LTD., Matsuyama-shi, Ehime-ken (JP)

(72) Inventors: Tomoaki Tange, Matsuyama (JP); Akinori Kawakami, Matsuyama (JP); Hitoshi Shiraishi, Matsuyama (JP); Yasutomo Zenman, Matsuyama (JP); Yasuhiko Saito, Matsuyama (JP); Takamichi Ide, Matsuyama (JP)

(73) Assignee: MIURA CO., LTD., Matsuyama-shi, Ehime-ken (JP)

( * ) Notice: Subject to any disclaimer, the term of this patent is extended or adjusted under 35 U.S.C. 154(b) by 249 days.

(21) Appl. No.: 15/022,646

(22) PCT Filed: Nov. 7, 2013

(86) PCT No.: PCT/JP2013/080160
§ 371 (c)(1),
(2) Date: Mar. 17, 2016

(87) PCT Pub. No.: WO2015/068246
PCT Pub. Date: May 14, 2015

(65) Prior Publication Data
US 2016/0236122 A1  Aug. 18, 2016

(51) Int. Cl.
*B01D 33/50* (2006.01)
*B01D 33/46* (2006.01)
(Continued)

(52) U.S. Cl.
CPC ............ *B01D 33/503* (2013.01); *B01D 33/11* (2013.01); *B01D 33/463* (2013.01); *B01D 33/50* (2013.01);
(Continued)

(58) Field of Classification Search
CPC ...... B01D 33/11; B01D 33/50; B01D 33/503; B01D 33/804; B01D 33/805;
(Continued)

(56) References Cited

U.S. PATENT DOCUMENTS

2012/0111788 A1   5/2012 Leath
2012/0312757 A1  12/2012 Ueyama et al.

FOREIGN PATENT DOCUMENTS

CN      202860208 U    4/2013
DE   202009007212 U1   9/2009
(Continued)

OTHER PUBLICATIONS

ISR for PCT/JP2013/080160 dated Dec. 17, 2013.
(Continued)

*Primary Examiner* — Terry K Cecil
(74) *Attorney, Agent, or Firm* — Kenichiro Yoshida

(57) ABSTRACT

A ballast water treatment device including a cylindrical filter (2) that is disposed in a casing (1) and filters and externally discharges ballast water having flowed inside, comprising: a filter rotating unit (3) that rotates the filter (2) around a shaft center of the filter (2); a suction nozzle (4) that is disposed on the primary side of the filter (2) and opens toward the inner circumferential surface of the filter (2); a waste rinsing water discharging unit (5) that externally discharges waste rinsing water sucked by the suction nozzle (4) from the casing (1); a high-pressure fluid jet nozzle (40) that is disposed on the secondary side of the filter (2), opens toward the outer circumferential surface of the filter (2), and jets high-pressure fluid toward the filter (2); and a high-pressure fluid supplying unit (41) that supplies high-pressure fluid to the high-pressure fluid jet nozzle (40). The ballast water treatment device enables rinsing of the filter (2) to be
(Continued)

performed efficiently and effectively, and achieves a simple structure and facilitated manufacture and maintenance.

8 Claims, 2 Drawing Sheets

(51) Int. Cl.
*B01D 33/80* (2006.01)
*B63B 13/00* (2006.01)
*C02F 1/00* (2006.01)
*B01D 33/11* (2006.01)
*B63J 4/00* (2006.01)
*C02F 103/00* (2006.01)

(52) U.S. Cl.
CPC ......... *B01D 33/804* (2013.01); *B01D 33/805* (2013.01); *B01D 33/806* (2013.01); *B01D 33/808* (2013.01); *B63B 13/00* (2013.01); *B63J 4/002* (2013.01); *C02F 1/004* (2013.01); *C02F 1/008* (2013.01); *C02F 2103/008* (2013.01); *C02F 2201/001* (2013.01); *C02F 2209/03* (2013.01); *C02F 2209/11* (2013.01); *C02F 2209/44* (2013.01); *C02F 2303/16* (2013.01)

(58) Field of Classification Search
CPC ................ B01D 33/806; B01D 33/808; B01D 2201/001; B01D 2201/082; B01D 2201/084

See application file for complete search history.

(56) References Cited

FOREIGN PATENT DOCUMENTS

| | | | | |
|---|---|---|---|---|
| GB | 1497866 A | * | 1/1978 | ........... B01D 33/067 |
| JP | 6-24707 U | | 4/1994 | |
| JP | 2004-141785 A | | 5/2004 | |
| JP | 2011-189237 A | | 9/2011 | |
| JP | 2011-251284 A | | 12/2011 | |
| JP | 2013-180666 A | | 9/2013 | |
| KR | 10-2011-0129864 A | | 12/2012 | |
| NL | 57708 C | | 6/1946 | |

OTHER PUBLICATIONS

Office Action for the Corresponding Chinese Application No. 20130080009.1, dated Feb. 23, 2017 with English translation.
Office Action for the Corresponding Korean Application No. 2016-7005846 dated Feb. 28, 2017 with English translation.
Supplementary European Search Report for corresponding European Application 13897150.2, dated May 30, 2017.

* cited by examiner

BALLAST WATER TREATMENT DEVICE

TECHNICAL FIELD

The present invention relates to a ballast water treatment device including a cylindrical filter that is disposed in a casing and filters and externally discharges ballast water having flowed inside.

BACKGROUND ART

A vessel such as a tanker usually stores water called ballast water in a ballast tank disposed on the vessel in order to balance the vessel under way while traveling toward another destination after unloading freight such as crude petroleum. Ballast water is normally charged at an unloading port and discharged at a loading port. Therefore, if these ports are located at different places, microorganisms such as plankton and bacteria in the ballast water comes to travel all over the world. Thus, ballast water is discharged at a loading port in a sea area different from that of an unloading port, and microorganisms in another sea area are released at the loading port and may destroy the ecosystem in the sea area. In order to prevent the marine environment from being destroyed by such ballast water, the International Maritime Organization (IMO) has entered into the International Convention for the Control and Management of Ships' Ballast Water and Sediments and has set a ballast water discharge standard to restrict the microorganism content in ballast water discharged from ships.

This ballast water discharge standard sets the discharge limits for plankton according to sizes, specifically, less than 10 individuals/$m^3$ for plankton of 50 μm or more and less than 10 individuals/ml for plankton of 10 to 50 μm. The ballast water discharge standard also sets the discharge limits for bacteria, such as less than 250 cfu/100 ml for coliform bacteria.

Ballast water to be stored in a ballast tank is thus required to be detoxified by killing microorganisms in ballast water. As a measure for detoxifying ballast water by killing microorganisms therein, there are known treatment techniques of the filtration of ballast water by a ballast water treatment device including a filter that is disposed in a casing and filters ballast water and the ultraviolet irradiation to ballast water by an ultraviolet irradiation device. The filter of the ballast water treatment device used in this treatment technique is required to remove 99.99% of plankton having a size of 50 μm or more. Accordingly, a filtration body such as through a wire mesh with minimum apertures is needed. For this reason, clogging is frequently caused, and constant rinsing of a filter is considered to be important.

As a known device for removing foreign substances deposited on the inner surface of the filter, Patent Literature 1 discloses a filtration device including: a suction nozzle that opens at a position facing the inner surface of the filter; a nozzle moving unit that moves the suction nozzle along the inner surface of the filter in the both axial and circumferential directions of the filter; a backwash nozzle that is disposed in a position facing the suction nozzle outside the filter and emits backwash water; and a backwash nozzle moving unit that moves the back wash nozzle in synchronization with and in the same direction as the suction nozzle.

Rinsing of a filter by the filtration device according to Patent Literature 1 is performed by opening a sludge removal valve when the pressure difference between the inside and outside of the filter reaches a predetermined pressure or more, emitting backwash water from the backwash nozzle, removing suspended matter deposited on the filter with rinsing water, and discharging sludge from the suction nozzle, while the suction nozzle and the backwash nozzle are moved by the nozzle moving unit and the backwash nozzle moving unit.

PRIOR ART LITERATURE

Patent Literature

Patent Literature 1: JP-A-2004-141785

DISCLOSURE OF THE INVENTION

Problems to be Solved by the Invention

Since the rinsing of a filter by the filtration device according to Patent Literature 1 is performed when the pressure difference between the inside and outside of the filter reaches a predetermined pressure or more, the rinsing is not performed until the pressure difference reaches the predetermined pressure or more. Therefore, a problem has been raised that the amount of treatment water decreases in a certain setting of a predetermined pressure value.

Furthermore, since the change in pressure difference level between the inside and outside of a filter is not associated with the frequency of movement of the suction nozzle and the backwash nozzle in the both axial and circumferential directions of a filter, rinsing cannot be efficiently performed. Especially, as in the case of a ballast water treatment device, there has been a problem that the known filtration device is not suitable for the treatment of water having a different fouling level depending on the water area or the treatment of water having a different fouling level depending on the time even in the same water area.

In addition, since the suction nozzle and the backwash nozzle move in the axial direction of a filter while rotating along the inner surface of a filter during rinsing, it takes a long time until the rinsing is completed. Accordingly, there has been a problem that it takes a long time until the pressure difference between the inside and outside of a filter is recovered.

Moreover, since the suction nozzle and the backwash nozzle move in the axial direction while rotating in synchronization with each other, a complicated mechanism is required. Accordingly, there has been a problem that troublesome work is required for manufacture and maintenance.

An objective of the present invention is to provide a ballast water treatment device that enables efficient and effective rinsing of a cylindrical filter that filters and externally discharges ballast water having flowed inside and that has a simple structure to facilitate manufacture and maintenance.

Solutions to the Problems

The invention for achieving the above-described objective is a ballast water treatment device including a cylindrical filter that is disposed in a casing and filters and externally discharges ballast water having flowed inside, including: a filter rotating unit that rotates the filter around a shaft center of the filter; a suction nozzle that is disposed on a primary side of the filter and opens toward an inner circumferential surface of the filter; a waste rinsing water discharging unit that externally discharges waste rinsing water sucked by the suction nozzle from the casing; a high-pressure fluid jet nozzle that is disposed on a secondary side of the filter, opens toward an outer circumferential surface of the filter, and jets high-pressure fluid toward the filter; and a high-pressure fluid supplying unit that supplies high-pressure fluid to the high-pressure fluid jet nozzle.

According to the invention, the suction nozzle disposed on the primary side of the filter sucks foreign substances deposited on the filter thereby enabling the foreign substances to be removed from the filter. After ballast water treatment operation is stopped, water remained in the casing is discharged, and high-pressure fluid is jetted to the outer circumferential surface of the filter from the high-pressure fluid jet nozzle while the filter is rotated. Consequently, the foreign substances deposited on the inner circumferential surface of the filter during ballast water treatment operation can be reliably peeled and removed.

The invention is the ballast water treatment device, including a rinsing water jet nozzle that is disposed on a secondary side of the filter, opens toward an outer circumferential surface of the filter, and jets rinsing water toward the filter.

According to the invention, the rinsing water jet nozzle disposed on the secondary side of the filter jets rinsing water toward the filter during ballast water treatment operation, thereby peeling foreign substances deposited on the filter. Consequently, foreign substances deposited on the filter can be effectively removed.

The invention is the ballast water treatment device, wherein the rinsing water jet nozzle is positioned on an identical circumference to the suction nozzle, and positioned before the suction nozzle toward a direction facing to a rotation direction of the filter.

According to the invention, rinsing water is jetted to the outer circumferential surface of the filter from the rinsing water jet nozzle before the suction nozzle toward the direction facing to the rotation direction of the filter while the filter is rotated. Accordingly, foreign substances deposited on the primary side of the filter can be efficiently peeled, and the foreign substances are sucked by the suction nozzle immediately after having been peeled. Consequently, foreign substances can be effectively sucked and removed.

The invention is the ballast water treatment device, including: a pressure difference detecting unit that detects a pressure difference between primary and secondary sides of the filter; and a controller of controlling the number of rotations of the filter based on a pressure difference detected by the pressure difference detecting unit.

According to the invention, the number of rotations is controlled based on the pressure difference detected by the pressure difference detecting unit. Accordingly, the fluid jet length of the rinsing water jet nozzle per unit time can be changed for the number of rotations of the filter according to the pressure difference. Consequently, foreign substances deposited on the inner circumferential surface of the filter can be effectively removed for a short time, and undue rotation of the filter can be suppressed.

The invention is the ballast water treatment device, including: a pressure difference detecting unit that detects a pressure difference between primary and secondary sides of the filter; and a controller of controlling to stop ballast water treatment operation, discharge water remained in the casing, and jet high-pressure fluid from the high-pressure fluid jet nozzle, when a pressure difference detected by the pressure difference detecting unit reaches a predetermined pressure.

According to the invention, when the pressure difference detected by the pressure difference detecting unit reaches a predetermined pressure, ballast water treatment operation is stopped, water remained in the casing is discharged, and high-pressure fluid is jetted from the high-pressure fluid jet nozzle. Accordingly, foreign substances, which have been deposited in the degree to which they cannot be removed from the filter by the suction by the suction nozzle during ballast water treatment operation, can be reliably peeled and removed from the filter.

The invention is the ballast water treatment device, including: a water quality measuring unit that measures water quality of treatment target water introduced into the casing; and a controller of controlling to stop ballast water treatment operation, discharge water remained in the casing, and jet high-pressure fluid from the high-pressure fluid jet nozzle, when water quality measured by the water quality measuring unit reaches a predetermined water quality.

According to the invention, when the water quality measured by the water quality measuring unit reaches a predetermined water quality, ballast water treatment operation is stopped, water remained in the casing is discharged, and high-pressure fluid is jetted from the high-pressure fluid jet nozzle. Accordingly, foreign substances, which have been deposited in the degree to which they cannot be removed from the filter by the suction by the suction nozzle during ballast water treatment operation, can be reliably peeled and removed from the filter.

The invention is the ballast water treatment device, including: a time measuring unit that measures filtration treatment time; and a controller of controlling to stop ballast water treatment operation, discharge water remained in the casing, and jet high-pressure fluid from the high-pressure fluid jet nozzle, when time measured by the time measuring unit reaches a predetermined time.

According to the invention, when the time measured by the time measuring unit reaches a predetermined time, ballast water treatment operation is stopped, water remained in the casing is discharged, and high-pressure fluid is jetted from the high-pressure fluid jet nozzle. Accordingly, foreign substances, which have been deposited in the degree to which they cannot be removed from the filter by the suction by the suction nozzle during ballast water treatment operation, can be reliably peeled and removed from the filter.

The invention is the ballast water treatment device, including: a counter that counts the number of operations of ballast water treatment operation; and a controller of controlling to stop ballast water treatment operation, discharge water remained in the casing, and jet high-pressure fluid from the high-pressure fluid jet nozzle, when the number of operations counted by the counter reaches a predetermined number.

According to the invention, when the number of operations counted by the counter reaches a predetermined number, ballast water treatment operation is stopped, water remained in the casing is discharged, and high-pressure fluid is jetted from the high-pressure fluid jet nozzle. Accordingly, foreign substances, which have been deposited in the degree to which they cannot be removed from the filter by the suction by the suction nozzle during ballast water treatment operation, can be reliably peeled and removed from the filter.

Effects of the Invention

According to the ballast water treatment device of the present invention, the filter used in ballast water treatment operation can be reliably and effectively rinsed.

DESCRIPTION OF PREFERRED EMBODIMENTS

Figure 1:
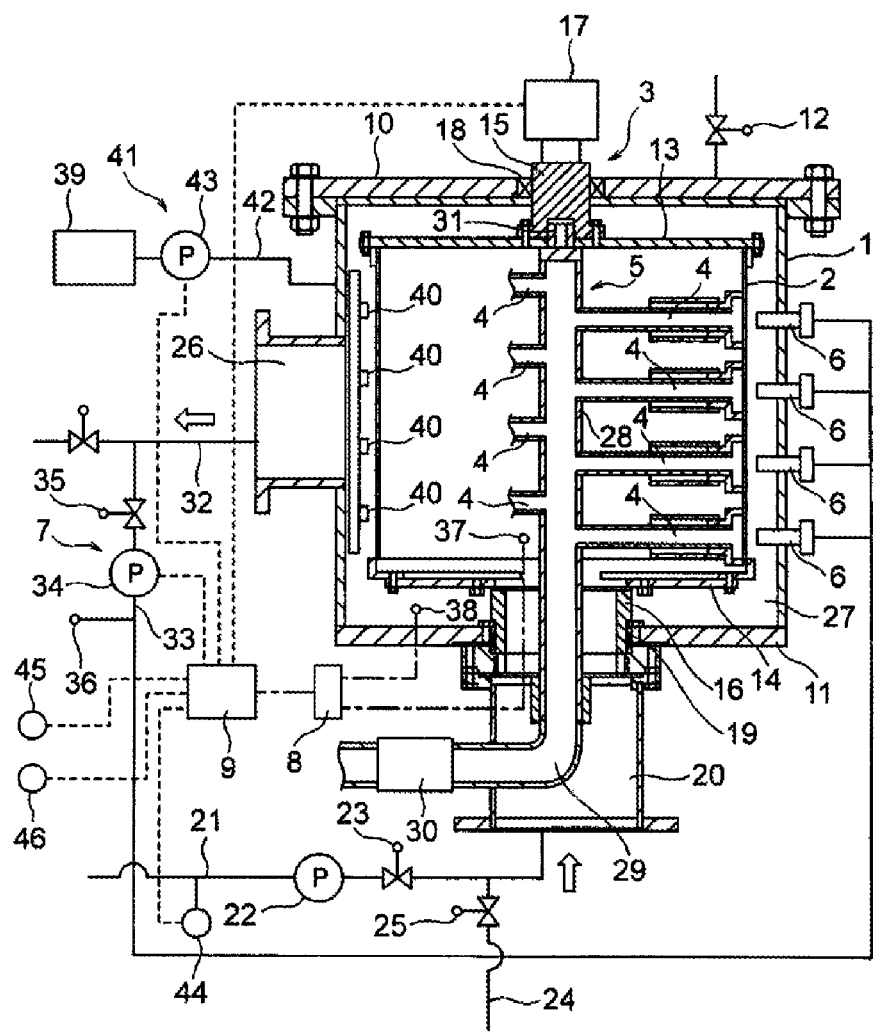
FIG. 1 is a schematic cross-sectional illustrative diagram of a ballast water treatment device according to an embodiment of the present invention.
Figure 2:
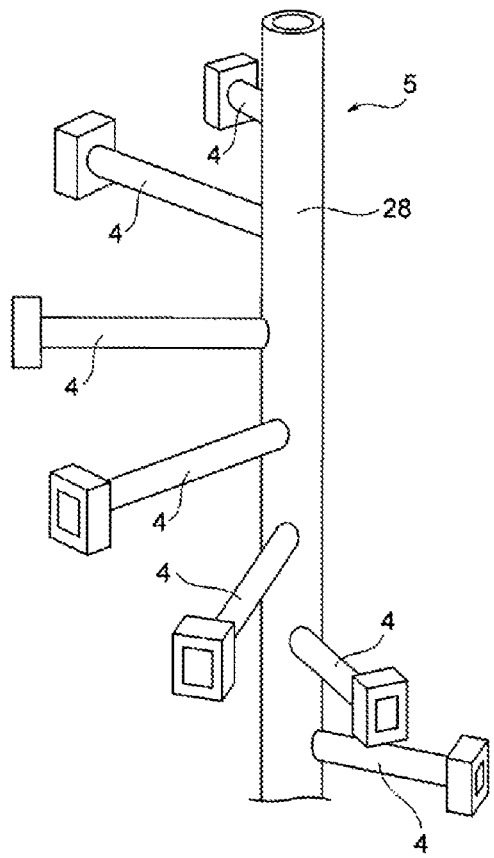
FIG. 2 is a perspective view of another example of an arrangement of suction nozzles.

Hereinafter, a ballast water treatment device according to an embodiment of the present invention will be described in detail with reference to the drawings. FIG. 1 is a schematic cross-sectional illustrative diagram, and FIG. 2 is a perspective view of another example of an arrangement of suction nozzles.

The ballast water treatment device of the present example includes: a cylindrical filter 2 that is disposed in a cylindrical casing 1 and filters and externally discharges treatment target water having flowed inside; a filter rotating unit 3 that rotates the filter 2 around a shaft center of the filter 2; a suction nozzle 4 that is disposed on the primary side of the filter 2 and opens toward the inner circumferential surface of the filter 2; a waste rinsing water discharging unit 5 that externally discharges waste rinsing water sucked by the suction nozzle 4 from the casing 1; a high-pressure fluid jet nozzle 40 that is disposed on the secondary side of the filter 2 and jets high-pressure fluid toward the outer circumferential surface of the filter 2; a high-pressure fluid supplying unit 41 that pressurizes and supplies high-pressure fluid to the high-pressure fluid jet nozzle 40; a rinsing water jet nozzle 6 that is disposed on the secondary side of the filter 2 and jets rinsing water toward the outer circumferential surface of the filter 2; a rinsing water supplying unit 7 that pressurizes and supplies rinsing water to the rinsing water jet nozzle 6; a pressure difference detecting unit 8 that detects a pressure difference between the primary and secondary sides of the filter 2; a water quality measuring unit 44 that measures water quality of treatment target water introduced into the casing 1; a time measuring unit 45 that measures filtration treatment time; and a counter 46 that counts the number of operations of ballast water treatment operation. The ballast water treatment device further includes a controller 9 having a control function of controlling to stop ballast water treatment operation, discharge water remained inside the casing 1, and jet high-pressure fluid from the high-pressure fluid jet nozzle 40, and a control function of controlling the number of rotations of the filter 2 based on the pressure difference detected by the pressure difference detecting unit 8, when the pressure difference detected by the pressure difference detecting unit 8 reaches a predetermined pressure, when the water quality measured by the water quality measuring unit 44 reaches a predetermined water quality, when the time measured by the time measuring unit 45 reaches a predetermined time, or when the number of operations of ballast water treatment operation counted by the counter 46 reaches a predetermined number.

In particular, the casing 1 has a cylindrical shape and includes an upper opening sealed with a lid 10 and a lower opening sealed with a bottom 11. The lid 10 includes an air bleeding valve 12 for bleeding air remained in the casing 1.

The cylindrical filter 2 disposed inside the casing 1 has an upper opening that is sealed by a top closure portion 13 and a lower opening that is separated by a bottom closure portion 14 and a later-described lower rotation shaft member 16 from a treatment water outflow space 27 side formed between the casing 1 and the filter 2. The filter 2 preferably has a structure in which a cylindrical filtration body such as a wire mesh is inserted between cylindrical supports formed with two thin metal plates each having many holes. However, the filter 2 may have a structure in which a filtration body is disposed on the outer circumferential surface of a cylindrical support formed with thin metal plate with many holes.

The filter rotating unit 3 that rotates such a filter 2 includes: an upper rotating shaft member 15 that is located at the shaft center of the filter 2 in the top closure portion 13 of the filter 2 and protrudes in the shaft center direction; a lower rotation shaft member 16 that is located at the shaft center of the filter 2 in the bottom closure portion 14 of the filter 2 and protrudes in the shaft center direction; and a motor 17 that rotates the upper rotation shaft member 15.

The upper rotation shaft member 15 penetrates the lid 10 of the casing 1, and is rotatably and liquid-tightly supported by the lid 10 via a sealed bearing member 18. The lower rotation shaft member 16 penetrates the bottom 11 of the casing 1, and is rotatably and liquid-tightly supported by the bottom 11 via a sealed bearing member 19.

The lower rotation shaft member 16 is a tubular body that communicates with the inside of the filter 2. The lower rotation shaft member 16 protruding from the bottom 11 of the casing 1 toward the outside of the casing 1 is connected to a treatment target water inlet 20 of the casing 1. The treatment target water inlet 20 is connected to a treatment target water introducing path 21. The treatment target water introducing path 21 is provided with: a pump 22 that pumps treatment target water; an on-off valve 23 located on the downstream side of the pump 22; a drainage path 24 connected to the treatment target water introducing path 21 on the downstream side of the on-off valve 23; and an on-off valve 25 disposed to the drainage path 24.

A treatment water outlet 26 is disposed on the side portion of the casing 1. Treatment target water having flowed through the treatment target water introducing path 21 and having been introduced from the treatment target water inlet 20 is designed to pass through the lower rotation shaft member 16 and enter the filter 2, pass through the filter 2 to be subjected to a filtration treatment and enter the treatment water outflow space 27 formed between the casing 1 and the filter 2, and be discharged from the treatment water outlet 26.

Of the suction nozzle 4 and the waste rinsing water discharging unit 5 for externally discharging waste rinsing water sucked by the suction nozzle 4 from the casing 1, the waste rinsing water discharging unit 5 will be first described. The waste rinsing water discharging unit 5 includes: a waste rinsing water collecting pipe 28 that is connected to the suction nozzle 4 and where waste rinsing water sucked by the suction nozzle 4 is collected; a waste rinsing water discharging pipe 29 that is connected to the waste rinsing water collecting pipe 28 and externally discharges waste rinsing water; and an on-off valve 30 that is provided to the waste rinsing water discharging pipe 29.

The waste rinsing water collecting pipe 28 is located at the shaft center of the filter 2 and has a closed upper end and an opened lower end. The upper end rotatably engages with a hole disposed in the center of the top closure portion 13 of the filter 2 via a bearing member 31. The lower end of the waste rinsing water collecting pipe 28 passes through the inside of the lower rotation shaft member 16 of the bottom closure portion 14 of the filter 2 in such a manner as not to inhibit rotation of the filter 2, and is fixed and supported by the treatment target water inlet 20 of the casing 1. The lower end of the waste rinsing water collecting pipe 28 is connected to the waste rinsing water discharging pipe 29 that externally discharges waste rinsing water. The waste rinsing water discharging pipe 29 is provided with the on-off valve 30 that always opens during operation.

The suction nozzle 4 that is connected to the waste rinsing water collecting pipe 28 and opens toward the inner circumferential surface of the filter 2 can preferably, but not necessarily, suck waste rinsing water from the entire axial region of the filter 2. For example, the suction nozzle 4 can be plurally disposed in the axial direction of the filter 2 linearly and/or with an angle circumferentially varied. The suction nozzle 4 that is plurally disposed with an angle circumferentially varied may be disposed at the same height or at a varied height.

In the present example, the suction nozzle 4 is plurally used. The plurality of suction nozzles 4 are linearly arranged in the axial direction of the filter 2 and connected to the waste rinsing water collecting pipe 28. In the present example, for eliminating non-sucked portions between the vertically arranged suction nozzles 4, the suction nozzles 4 are arranged in two rows in the axial direction of the filter 2, such that the suction nozzles 4 in one row are located between the suction nozzles 4 in the other row. Specifically, the suction nozzles 4 are arranged alternately in the height direction on both left and right sides of the waste rinsing water collecting pipe 28.

As another example of the arrangement of the suction nozzles 4 in the axial direction of the filter 2, the plurality of suction nozzles 4 may be spirally arranged, as illustrated in FIG. 2, in the axial direction of the filter 2 at intervals that eliminate non-sucked portions between the suction nozzles 4. The openings of the suction nozzles 4 that open toward the filter 2 at a position facing the inner circumferential surface of the filter 2 are slidably in close contact with the inner circumferential surface of the filter 2.

The high-pressure fluid jet nozzle 40 that is disposed on the secondary side of the filter 2 and opens toward the outer circumferential surface of the filter 2 can preferably, but not necessarily, jet high-pressure fluid to the entire axial region of the filter 2. For example, the high-pressure fluid jet nozzle 40 can be plurally disposed in the axial direction of the filter 2 linearly and/or with an angle circumferentially varied. The high-pressure fluid jet nozzle 40 that is plurally disposed with an angle circumferentially varied may be disposed at the same height or at a varied height.

In the present example, cleaning water is used as high-pressure fluid supplied to the high-pressure fluid jet nozzle 40. Examples of the cleaning water to be used include treatment water treated in the filter 2, water stored in a ballast tank, and domestic water and potable water stored for the purpose of other uses.

In the high-pressure fluid supplying unit 41 for supplying cleaning water as high-pressure water, a tank 39 and the high-pressure fluid jet nozzle 40 are connected through a cleaning water supplying path 42, and cleaning water stored in the tank 39 is pumped to each of the high-pressure fluid jet nozzles 40 by a pump 43.

It is noted that although cleaning water is used as high-pressure fluid supplied to the high-pressure fluid jet nozzle 40 in the present example, high-pressure air may be used as high-pressure fluid. In this case, the high-pressure fluid supplying unit 41 supplies high-pressure air to the high-pressure fluid jet nozzle 40 by an air compressor (not shown). Water vapor may be alternatively used as high-pressure fluid.

The rinsing water jet nozzle 6 for jetting rinsing water toward the filter 2 is disposed on the side portion of the casing 1 and opens toward the inside of the casing 1.

The rinsing water jet nozzle 6 can preferably, but not necessarily, jet rinsing water to the entire axial region of the filter 2. For example, the rinsing water jet nozzle 6 can be plurally disposed in the axial direction of the filter 2 linearly and/or with an angle circumferentially varied. The rinsing water jet nozzle 6 that is plurally disposed with an angle circumferentially varied may be disposed at the same height or at a varied height.

In the present example, each of the rinsing water jet nozzles 6 is positioned on the same circumference as each of the plurality of the suction nozzles 4, and positioned before the suction nozzle 4 toward the direction facing to the rotation direction of the filter 2. However, each of the rinsing water jet nozzles may be positioned to face each of the suction nozzles 4, or may be positioned after the suction nozzle 4 toward the direction facing to the rotation direction of the filter 2.

In the present example, the rinsing water supplying unit 7 for pressurizing and supplying rinsing water to the rinsing water jet nozzle 6 uses as rinsing water the treatment water treated in the filter 2. One end of a rinsing water supplying path 33 is connected in the middle of a treatment water path 32 connected to the treatment water outlet 26 of the filter 2, and the other end of the rinsing water supplying path 33 is connected to each of the rinsing water jet nozzles 6. Thus, treatment water treated in the filter 2 is configured to be supplied to the rinsing water jet nozzles 6 through the rinsing water supplying path 33. The rinsing water supplying path 33 is provided with a pump 34 for pumping treatment water to the rinsing water jet nozzles 6 and an on-off valve 35 disposed on the upstream side of the pump 34. In the present example, a pressure gauge 36 is also, but not necessarily, disposed on the downstream side of the pump 34.

It is noted that although treatment water treated in the filter 2 is used as rinsing water in the present example, water stored in a ballast tank, domestic water and potable water stored for the purpose of other uses, and the like may be used as the rinsing water.

The pressure difference detecting unit 8 for detecting a pressure difference between the primary and secondary sides of the filter 2 is configured to detect pressures on the primary and secondary sides of the filter 2 by pressure sensors 37 and 38 respectively disposed in the filter 2 and the treatment water outflow space 27, and detect a pressure difference between the primary and secondary sides of the filter 2.

The fouling degree of the filter 2 can be determined based on the pressure difference between the primary and secondary sides of the filter 2. That is, a large pressure difference indicates an increased amount of deposited foreign substances to the filter 2, and a small pressure difference indicates that the filter 2 is in a state close to an initial state.

In the present invention, a turbidimeter for measuring turbidity of treatment target water is used as the water quality measuring unit 44 for measuring water quality of treatment target water introduced into the casing 1. The turbidimeter is disposed on the treatment target water introducing path 21. The fouling degree of the filter 2 can be determined based on the turbidity of treatment target water. That is, high turbidity indicates an increased amount of deposited foreign substances to the filter 2, and low turbidity indicates that the filter 2 is in a state close to an initial state.

In the present example, a timer is used as the time measuring unit 45 that measures filtration treatment time. The fouling degree of the filter 2 can be determined based on the length of a measured time. That is, a long time indicates an increased amount of deposited foreign substances to the filter 2, and a short time indicates that the filter 2 is in a state close to an initial state.

In the present example, a counter is used as the counter 46 that counts the number of operations of ballast water treatment operation. The fouling degree of the filter 2 can be determined based on the counted number. That is, a high number indicates an increased amount of deposited foreign substances to the filter 2, and a low number indicates that the filter 2 is in a state close to an initial state.

The controller 9 has a control function of controlling to stop ballast water treatment operation, discharge water remained inside the casing 1, and jet high-pressure fluid from the high-pressure fluid jet nozzle 40 while the filter 2 is rotated, and a control function of controlling the number of rotations of the filter 2 based on the pressure difference detected by the pressure difference detecting unit 8, when the pressure difference detected by the pressure difference detecting unit 8 reaches a predetermined pressure, when the water quality measured by the water quality measuring unit 44 reaches a predetermined water quality, when the time measured by the time measuring unit 45 reaches a predetermined time, or when the number of operations counted by the counter 46 reaches a predetermined number.

As described herein, the predetermined pressure is set to be a pressure difference for which it is judged that foreign substances deposited to the filter 2 cannot be peeled even when rinsing water is jetted from the later-described rinsing water jet nozzle 6 to the outer circumferential surface of the filter 2 during ballast water treatment operation.

The predetermined water quality is set to be water quality for which it is judged that the amount of foreign substances deposited on the inner circumferential surface of the filter 2 estimated based on the water quality of treatment target water introduced in the casing 1 cannot be removed by suction of the suction nozzle 4. As the water quality measuring unit 44, for example, a turbidimeter for measuring turbidity of treatment target water is used.

The predetermined time is set to be a time for which it is judged that the amount of foreign substances deposited on the inner circumferential surface of the filter 2 estimated based on the filtration treatment time cannot be removed by suction of the suction nozzle 4.

The predetermined number is set to be a number for which it is judged that the amount of foreign substances deposited on the inner circumferential surface of the filter 2 estimated based on the number of operations of ballast water treatment operation cannot be removed by suction of the suction nozzle 4.

There are provided control functions of controlling to stop ballast water treatment operation, discharge water remained inside the casing 1, and jet high-pressure fluid from the high-pressure fluid jet nozzle 40 while the filter 2 is rotated, when the pressure difference detected by the pressure difference detecting unit 8 reaches a predetermined pressure, when the water quality measured by the water quality measuring unit 44 reaches the predetermined water quality, when the time measured by the time measuring unit 45 reaches a predetermined time, or when the number of operations counted by the counter 46 reaches a predetermined number. Such control functions can be simultaneously or selectively executed.

In the present example, an allowable pressure difference ($\Delta P1$) is defined with respect to an initial pressure difference stored in the controller 9, and several pressure difference levels of $\Delta P1$ or higher are defined. The control function of controlling the number of rotations of the filter 2 based on the pressure difference detected by detecting unit 8 of the controller 9 is configured to change the number of rotations of the filter 2 according to the defined pressure difference levels.

As an example of this control function, $\Delta P1$, $\Delta P2$, and $\Delta P3$ are defined stepwise toward the direction that increases the pressure difference, and N1, N2, N3, and N4 are defined stepwise corresponding to these defined pressure differences toward the direction that increases the number of rotations of the filter 2. The number of rotations of the filter 2 is controlled to be N1 when the pressure difference is $\Delta P1$ or lower, N2 when the pressure difference exceeds $\Delta P1$, N3 when the pressure difference exceeds $\Delta P2$, and N4 when the pressure difference exceeds $\Delta P3$.

As another example, the rotation of the filter 2 may be controlled to be stopped when the pressure difference is $\Delta P1$ or lower, and the number of rotations may be controlled to be N1 when the pressure difference exceeds $\Delta P1$, N2 when the pressure difference exceeds $\Delta P2$, and N3 when the pressure difference exceeds $\Delta P3$.

In the present example, the controller 9 further has: a control function of controlling to jet rinsing water from the rinsing water jet nozzle 6 when the pressure difference detected by the pressure difference detecting unit 8 reaches a second predetermined pressure; and a function of controlling the pressure of rinsing water jetted from the rinsing water jet nozzle 6 according to the detected pressure difference.

As described herein, the second predetermined pressure is set to be a pressure difference for which it is judged that the amount of foreign substances deposited to the filter 2 cannot be removed by suction of the suction nozzle 4.

Figure 3:
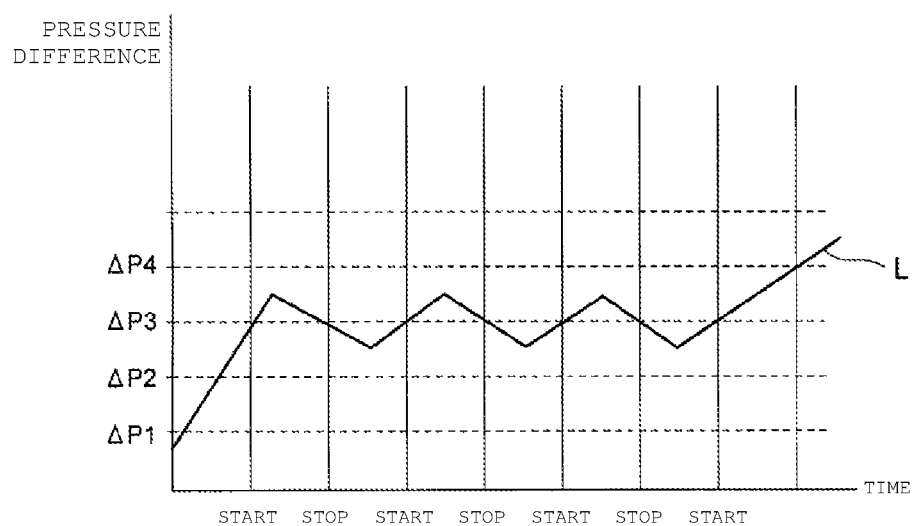
FIG. 3 is a graph indicating a relationship between a pressure difference between primary and secondary sides of a filter and supply of rinsing water to a rinsing water jet nozzle.

In the present example, an initial pressure difference is stored, and an allowable pressure difference ($\Delta P1$) is defined with respect to the initial pressure difference as illustrated in FIG. 3. Several pressure difference levels of $\Delta P1$ or higher are defined, and $\Delta P3$ is defined as the predetermined pressure. It is controlled to start supply of rinsing water to the rinsing water jet nozzle 6 when the pressure difference exceeds $\Delta P3$, and to stop the supply when the supply pressure difference L returns to $\Delta P3$ or lower.

Furthermore, the pressure of rinsing water jetted from the rinsing water jet nozzle 6 is set to be increased according to the pressure difference exceeding $\Delta P3$.

In the ballast water treatment device configured as described above, the suction nozzle 4 connected to the waste rinsing water collecting pipe 28 is plurally used. The suction nozzles 4 are connected to the waste rinsing water collecting pipe 28 and linearly disposed in the axial direction of the filter 2 in a state where the openings of the suction nozzles 4 are slidably in close contact with the inner circumferential surface of the filter 2. The vertically disposed suction nozzles 4 are disposed alternately in the height direction on the left and right sides of the waste rinsing water collecting pipe 28 for eliminating non-sucked portions between the suction nozzles 4. Therefore, one rotation of the filter 2 enables suction from the entire inner circumferential surface region of the filter 2.

The on-off valve 30 provided to the waste rinsing water discharging pipe 29 always opens during operation, and the pressure on the secondary side of the on-off valve 30 is released to atmospheric pressure. Accordingly, the pressure inside the waste rinsing water collecting pipe 28 becomes lower than the pressure on the secondary side of the filter 2. Thus, the treatment water present on the secondary side of the filter 2 flows as waste rinsing water into the waste rinsing water collecting pipe 28 and is externally discharged from the waste rinsing water discharging pipe 29.

The high-pressure fluid jet nozzle 40 for jetting high-pressure fluid toward the filter 2 is plurally used, and the plurality of high-pressure fluid jet nozzles 40 can jet high-pressure fluid to the entire axial region of the filter 2. Accordingly, one rotation of the filter 2 enables high-pressure fluid to be jetted to the entire outer circumferential surface region of the filter 2. This allows foreign substances deposited on the primary side of the filter 2 to be efficiently peeled.

Furthermore, the rinsing water jet nozzle 6 for jetting rinsing water toward the filter 2 is plurally used, disposed so that rinsing water can be jetted to the entire axial region of the filter 2, positioned on the same circumference as each of the plurality of suction nozzles 4, and arranged before the suction nozzle 4 toward the direction facing to the rotation direction of the filter 2. Accordingly, one rotation of the filter 2 enables rinsing water to be jetted to the entire outer circumferential surface region of the filter 2. This allows foreign substances deposited on the primary side of the filter 2 to be efficiently peeled. Since sucking by the suction nozzle 4 is performed immediately after foreign substances were peeled, the foreign substances having been peeled from the filter 2 with rinsing water jetted from the rinsing water jet nozzle 6 are effectively sucked by the suction nozzle 4.

The on-off valve 30 provided to the waste rinsing water discharging pipe 29 always opens during operation, and the pressure on the secondary side of the on-off valve 30 is released to atmospheric pressure. Accordingly, the pressure inside the waste rinsing water collecting pipe 28 becomes lower than the pressure on the secondary side of the filter 2. Thus, treatment water present on the secondary side of the filter 2 and the rinsing water having been jetted from the rinsing water jet nozzle 6 flow as waste rinsing water into the waste rinsing water collecting pipe 28 and are externally discharged from the waste rinsing water discharging pipe 29.

When the pressures of the primary and secondary sides of the filter 2 are always detected by the pressure sensors 37 and 38 during ballast water treatment operation as illustrated in FIG. 3, and the pressure difference L between the primary and secondary sides of the filter 2 detected by the pressure difference detecting unit 8 reaches pressure difference ΔP3 which has been set as a predetermined pressure, further particularly when the pressure difference L exceeds ΔP3, supply of rinsing water to the rinsing water jet nozzle 6 is started, and the rinsing water is jetted from the rinsing water jet nozzle 6. When the pressure difference L returns to ΔP3 or lower, the supply is stopped, and the jetting of rinsing water from the rinsing water jet nozzle 6 is stopped. When even jetting of rinsing water from the rinsing water jet nozzle 6 does not cause the pressure difference L to become ΔP3 or lower and further increase, the jetting pressure of rinsing water from the rinsing water jet nozzle 6 is increased corresponding to the pressure difference exceeding the pressure difference ΔP3.

In this manner, rinsing water is not jetted from the rinsing water jet nozzle 6 until the pressure difference detected by the pressure difference detecting unit 8 reaches a predetermined pressure. Therefore, wasting of the discharged amount of treatment water used as rinsing water can be effectively suppressed. When even jetting of rinsing water from the rinsing water jet nozzle 6 does not cause the pressure difference to decrease, and the pressure difference further increases, the jetting pressure of the rinsing water from the rinsing water jet nozzle 6 is increased corresponding to the pressure difference exceeding the second predetermined pressure. Therefore, foreign substances deposited on the primary side of the filter 2 can be more reliably peeled.

When even the jetting of rinsing water from the rinsing water jet nozzle 6 does not cause the pressure difference to decrease, and the pressure difference further increases to reach a predetermined pressure, ballast water treatment operation is stopped to discharge water remained in the casing 1, and high-pressure fluid is jetted from the high-pressure fluid jet nozzle 40 while the filter 2 is rotated.

In this manner, when the pressure difference detected by the pressure difference detecting unit 8 reaches a predetermined pressure, ballast water treatment operation is stopped to discharge water remained in the casing 1, and high-pressure fluid is jetted from the high-pressure fluid jet nozzle 40. Therefore, foreign substances, which have been deposited in the degree to which they cannot be peeled from the filter 2 by the jetting of rinsing water during ballast water treatment operation, can be more reliably peeled and removed from the filter 2.

Furthermore, in the present example, when the water quality measured by the water quality measuring unit 44 reaches a predetermined water quality, ballast water treatment operation is stopped to discharge water remained in the casing 1, and high-pressure fluid is jetted from the high-pressure fluid jet nozzle 40. Therefore, foreign substances, which have been deposited in the degree to which they cannot be peeled from the filter 2 by the jetting of rinsing water during ballast water treatment operation, can be more reliably peeled and removed from the filter 2.

Furthermore, in the present example, when the time measured by the time measuring unit 45 reaches a predetermined time, ballast water treatment operation is stopped to discharge water remained in the casing 1, and high-pressure fluid is jetted from the high-pressure fluid jet nozzle 40. Therefore, foreign substances, which have been deposited in the degree to which they cannot be peeled from the filter 2 by the jetting of rinsing water during ballast water treatment operation, can be more reliably peeled and removed from the filter 2.

Furthermore, in the present example, when the number of operations measured by the counter 46 reaches a predetermined number, ballast water treatment operation is stopped to discharge water remained in the casing 1, and high-pressure fluid is jetted from the high-pressure fluid jet nozzle 40. Therefore, foreign substances, which have been deposited in the degree to which they cannot be peeled from the filter 2 by the jetting of rinsing water during ballast water treatment operation, can be more reliably peeled and removed from the filter 2.

Furthermore, in the present example, there is provided a function of controlling the number of rotations of the filter 2 based on the pressure difference detected by the pressure difference detecting unit 8. The number of rotations of the filter 2 is adjusted by associating the pressure difference detected by the pressure difference detecting unit 8 with the previously defined pressure difference level based on the detected pressure difference and changing the number of rotations of the filter 2 to the number of rotations according to the corresponding pressure difference level.

In the present example, when the pressure difference detected by the pressure difference detecting unit 8 exceeds ΔP1, and the pressure difference further increases, the number of rotations of the filter 2 is increased stepwise according to the stepwise defined pressure differences. When the pressure difference decreases, the number of rotations of the filter 2 is decreased according to the defined pressure differences. When the pressure difference returns to ΔP1 or lower, the number of rotations of the filter 2 is adjusted so that the rotation of the filter 2 is returned to the number of rotations defined for ΔP1 or lower, or the rotation of the filter 2 is stopped. Accordingly, when the amount of foreign substances deposited on the inner circumferential surface of the filter 2 is large, the number of rotations of the filter 2 is increased thereby to lengthen the suction length of the suction nozzle 4 and the rinsing water jet length of the rinsing water jet nozzle 6 per unit time. When the amount of the foreign substances is small, the number of rotations of the filter 2 is decreased thereby to shorten the suction length and the rinsing water jet length per unit time.

In this manner, the fouling degree of the filter 2 is determined by the pressure difference between the primary and secondary sides of the filter 2, and the number of rotations of the filter 2 is controlled based on the pressure difference. Therefore, the suction length of the suction nozzle 4 and the rinsing water jet length of the rinsing water jet nozzle 6 per unit time can be changed with respect to the number of rotations of the filter 2 according to the fouling degree. Consequently, foreign substances deposited on the inner circumferential surface of the filter 2 can be effectively removed for a short time, and undue rotation of the filter 2 can be suppressed.

The present invention can be implemented in various other forms without departing from the spirit or essential characteristics of the present invention. Therefore, the above-described embodiments or examples are merely illustrative in all respects and should not be interpreted in a limiting manner. The scope of the present invention is indicated by the claims, and not restricted by the description of this specification. Furthermore, all modifications and changes belonging to a scope equivalent to the claims fall within the scope of the present invention.

DESCRIPTION OF REFERENCE SIGNS

1 Casing
2 Filter
3 Filter rotating unit
4 Suction nozzle
5 Rinsing waste water discharging unit
6 Rinsing water jet nozzle
8 Pressure difference detecting unit
9 Controller
20 Treatment target water inlet
26 Treatment water outlet
28 Rinsing waste water collecting pipe
37, 38 Pressure sensor
40 High-pressure fluid jet nozzle
41 High-pressure fluid supplying unit
44 Water quality measuring unit
45 Time measuring unit
46 Counter

What is claimed is:

1. A ballast water treatment device including a cylindrical filter that is disposed in a casing and filters and externally discharges ballast water having flowed inside, comprising:
   a filter rotating unit that rotates the filter around a shaft center of the filter;
   a suction nozzle that is disposed on a primary side of the filter and opens toward an inner circumferential surface of the filter;
   a waste rinsing water discharging unit that externally discharges waste rinsing water sucked by the suction nozzle from the casing;
   a rinsing water jet nozzle that is disposed on a secondary side of the filter, opens toward an outer circumferential surface of the filter, and jets rinsing water toward the filter;
   a high-pressure fluid jet nozzle that is disposed on a secondary side of the filter, opens toward an outer circumferential surface of the filter, and jets high-pressure fluid toward the filter;
   a pressure difference detecting unit that detects a pressure difference between primary and secondary sides of the filter;
   a high-pressure fluid supplying unit that supplies high-pressure fluid to the high-pressure fluid jet nozzle;
   a rinsing water jet unit that pressurizes and supplies the rinsing water to the rinsing water jet nozzle; and
   a controller in response to the pressure difference detecting unit
      (i) configured for activating the rinsing water jet unit upon detecting the pressure difference at a first predetermined pressure value; and
      (ii) configured for stopping ballast treatment operation unit upon detecting the pressure difference at a second predetermined pressure that is higher than a first predetermined pressure value and activating the high-pressure fluid supplying unit.

2. The ballast water treatment device according to claim 1, comprising a counter that counts number of operation of ballast water treatment operation,
   wherein when the number of operations counted by the counter reaches a predetermined number, the controller stops ballast water treatment operation.

3. The ballast water treatment device according to claim 2,
   wherein high-pressure fluid jetted from the high-pressure fluid jet nozzle is cleaning water, high-pressure air, or water vapor.

4. The ballast water treatment device according to claim 1, comprising a water quality measuring unit that measures water quality of treatment target water introduced into the casing,
   wherein when the water quality measured by the water quality measuring unit reaches a predetermined water quality, the controller stops ballast water treatment operation.

5. The ballast water treatment device according to claim 1, comprising a time measuring unit that measures filtration treatment time,
   wherein when the time measured by the time measuring unit reaches a predetermined time, the controller stops ballast water treatment operation.

6. The ballast water treatment device according to claim 1,
   wherein high-pressure fluid jetted from the high-pressure fluid jet nozzle is cleaning water, high-pressure air, or water vapor.

7. The ballast water treatment device according to claim 1,
   the high-pressure fluid jet nozzle comprising a plurality of jet nozzles arranged to spray an entire axial region of the filter.

8. The ballast water treatment device according to claim 1,
   wherein a jetting pressure of high-pressure fluid by the high-pressure fluid jet nozzle is higher than a jetting pressure of rinsing water by the rinsing water jet nozzle.

* * * * *